United States Patent [19]
Yamada et al.

[11] Patent Number: 5,497,619
[45] Date of Patent: Mar. 12, 1996

[54] EXHAUST GAS PURIFICATION APPARATUS

[75] Inventors: Jun Yamada, Okazaki; Kenji Kanehara, Toyohashi; Toshihiko Igashira, Toyokawa; Shingo Morishima, Aichi; Toshihiro Takada, Susono; Hiroshi Hirayama, Okazaki, all of Japan

[73] Assignees: Nippon Soken, Inc., Nishio; Toyota Jidosha Kabushiki Kaisha, Toyota, both of Japan

[21] Appl. No.: 268,946

[22] Filed: Jun. 30, 1994

[30] Foreign Application Priority Data

Jul. 6, 1993 [JP] Japan ................................. 5-166985
Apr. 22, 1994 [JP] Japan ................................. 6-084781

[51] Int. Cl.⁶ .......................... F02M 5/06; F01N 3/28
[52] U.S. Cl. .................................. 60/279; 60/297
[58] Field of Search .......................... 60/279, 274, 297

[56] References Cited

U.S. PATENT DOCUMENTS

| | | | |
|---|---|---|---|
| 3,492,980 | 2/1970 | Beck | 60/279 |
| 4,304,207 | 12/1981 | Aihara | 60/279 |
| 4,934,142 | 6/1990 | Hayashi et al. | |
| 4,985,210 | 1/1991 | Minami | |
| 5,051,244 | 9/1991 | Dunne et al. | |
| 5,125,231 | 6/1992 | Patil | 60/297 |
| 5,140,811 | 8/1992 | Minami et al. | |
| 5,315,824 | 5/1994 | Takeshima | 60/297 |

FOREIGN PATENT DOCUMENTS

| | | | |
|---|---|---|---|
| 55-153812 | 12/1980 | Japan . | |
| 159714 | 7/1987 | Japan | 60/279 |
| 62-189309 | 8/1987 | Japan . | |
| 63-68713 | 3/1988 | Japan . | |
| 1257710 | 10/1989 | Japan . | |
| 2135126 | 5/1990 | Japan . | |

*Primary Examiner*—Douglas Hart
*Attorney, Agent, or Firm*—Cushman, Darby & Cushman

[57] ABSTRACT

A bent portion (adsorption box) is formed in part of an exhaust pipe connecting exhaust ports and a catalyst for purifying HC or the like in the exhaust gas, and a HC adsorbent of a honeycomb structure is placed forward with respect to the direction in which the exhaust gas travels straight without turning at the bent portion. The exhaust gas flowing from the exhaust ports, turns, and flows into the exhaust pipe, but HC having a large particle size travels straight along rectifier blades to be adsorbed by the HC adsorbent and held for a while. During such process, the catalyst connected to the exhaust pipe is heated up to be activated, thereby for purifying the HC or the like which is desorbed by the temperature rise of the adsorbent. Another HC catalyst may be carried in the front of the adsorbent that is easily heated to a high temperature, or an EGR passage including an EGR control valve may be connected downstream from the adsorbent.

15 Claims, 16 Drawing Sheets

EXHAUST GAS PURIFICATION APPARATUS

BACKGROUND OF THE INVENTION

The present invention relates to an exhaust gas purification apparatus for making harmless hydrocarbon (HC) which is discharged in relatively large amounts at cold-starting of an internal combustion engine such as a gasoline engine.

As a prior art, an exhaust gas purification system is known, wherein a zeolite HC adsorbent is installed in part of an exhaust pipe to trap HC as an unburnt component which is discharged at cold-starting of an internal combustion engine, and HC separated from the adsorbent is purified by an oxidation catalyst installed downstream from the adsorbent. (By way of example, refer to Japanese Patent Unexamined Publication No. 2-135126.)

In a conventional system, since a HC adsorbent is placed over an entire section across the exhaust passage upstream from a catalyst so that all exhaust gas passes through the HC adsorbent, a problem arises in that an exhaust resistance is made high by the HC adsorbent, whereby there is a fear that an output of an internal combustion engine is reduced. Also, since all exhaust gas passes through the HC adsorbent, the heat of the exhaust gas is transferred to the adsorbent and the temperature increase of the adsorbent is accelerated. As a result, there is also a fear that HC adsorbed by the adsorbent begins to desorb out before the downstream oxidation catalyst is heated to an activation temperature at which it starts purifying exhaust gas such as oxidation of HC and HC is discharged while still unpurified. In order to prevent this disadvantage, needs are resulted such as addition of an auxiliary heating means for rapidly increasing the temperature of the oxidation catalyst to activate. Accordingly, the system becomes complex and costly.

Further, another problem arises in that, generally, the zeolite HC adsorbent must be placed relatively downstream in the exhaust pipe where the temperature of the exhaust gas becomes low because the heat resistance of the zeolite HC adsorbent is about 700° C. which is low and, thus, as to the oxidation catalyst which is provided more downstream where the exhaust gas temperature is lower, a burden is put on the auxiliary heating means to activate the oxidation catalyst early, for instance, extremely large amounts of electric power are consumed if the auxiliary heating means is an electric heater.

Accordingly, it is an object of the invention to provide an exhaust gas purification apparatus or, more particularly, and apparatus for reducing HC at engine start, wherein engine output is not reduced by exhaust resistance due to an adsorbent, there is no need to provide any special auxiliary heating means such as an electric heater in a catalyst for purifying the HC desorbed from the adsorbent, and a low heat-resistant adsorbent like zeolite can be used.

The invention provides an exhaust gas purification apparatus in which a bent or branched portion is formed in part of an exhaust passage connecting exhaust ports of an internal combustion engine to a catalyst for purifying at least HC from the exhaust gas, and a HC adsorbent is placed in an extended portion forward with respect to a blow-down direction of the exhaust gas which travels straight without turning at the bent portion.

In a second embodiment, the HC adsorbent is adapted to adsorb HC in the exhaust gas in a temperature range in which the catalyst is inactive, and to desorb the adsorbed HC mainly in a temperature range in which the catalyst is active.

Similarly, in a third embodiment, the HC adsorbent carries a zeolite HC adsorbent by means of a heat-resistant carrier.

In a fourth embodiment, a rectifier means for guiding the exhaust gas is provided between the exhaust ports and the HC adsorbent.

In a fifth embodiment, the HC adsorbent includes a cooling means for delaying temperature rise of the HC adsorbent.

In a sixth embodiment, the HC adsorbing means has a cover means for delaying temperature rise of the HC adsorbent.

In a seventh embodiment, an EGR passage to be connected to an intake passage of the internal combustion engine is connected downstream from the HC adsorbent, and an EGR control valve for opening/closing the EGR passage is provided in part of the EGR passage.

Similarly, in an eighth embodiment, an air-fuel ratio sensor is provided upstream from the catalyst, and control cycle of air-fuel ratio feedback control of the internal combustion engine based on a detected value of the air-fuel ratio sensor is made shorter upon opening of the EGR control valve than that upon closing of the EGR control valve.

In a ninth embodiment, the HC adsorbent is placed in a junction in an exhaust manifold.

Similarly, in a tenth embodiment, the HC adsorbent is formed with a communication path for communication among spaces existing forward with respect to the blow-down direction of the exhaust gas flowing from each exhaust port of a plurality of cylinders having different exhaust timing in the internal combustion engine.

In an eleventh embodiment, throat for controlling the flow is provided in the communication path.

In a twelfth embodiment, HC purification catalyst is carried by a portion of the HC adsorbent which is heated to a relatively high temperature.

Similarly, in a thirteenth embodiment, the HC adsorbent comprises a plurality of materials having different specific heat, and the HC purification catalyst is carried by a carrier made of a material having a small specific heat.

In a fourteenth embodiment, a carrier of the adsorbent is made of a ceramic, and the carrier of the HC purification catalyst is made of a heat-resistant metal such as stainless steel.

The hydrocarbon (HC) discharged in relatively large amounts as an unburnt component of a fuel, for instance, at engine start includes particles of various sizes from large particles such as liquid fuel particles to small particles such as vaporized gaseous molecules, and, more particularly, at engine start, includes many particles of relatively large particles sizes and large specific gravity like liquid fuel particles because the temperature in the combustion chamber is still low.

Since each of the embodiments of the invention commonly comprises the basic construction shown in the first embodiment, when an exhaust gas containing many relatively large HC particles passes through the bent portion formed in part of the exhaust passage at engine start, the gaseous components of the exhaust gas smoothly curve and flow toward the catalyst substantially without receiving any resistance because of their small specific gravity, but many of the HC particles of large specific gravity separate from the exhaust gas by the action of inertia and travel straight in the blow-down direction along with a relatively small amount of exhaust gas, and strike against HC adsorbent provided forward, where they absorbed and trapped.

Accordingly, when the catalyst is still inactive at engine start, the HC-rich exhaust gas is prevented from passing through the catalyst and being discharged outside. While HC is adsorbed by the adsorbent, the catalyst receives the heat of the exhaust gas to increase in temperature, and reaches the activation temperature to begin purifying the HC. Since, in each embodiment of the invention, most of the exhaust gas flows while curving at the bent portion formed in part of the exhaust passage, an amount of the exhaust gas flowing into the HC adsorbent is slight, and thus no hindrance even if a relatively low heat-resistant adsorbent, for instance, a zeolite, is provided relatively upstream in the exhaust passage along with the bent portion, whereby the catalyst can be provided relatively upstream in the exhaust passage.

Accordingly, as compared with the conventional case wherein the catalyst is provided downstream from the HC adsorbent provided downstream in the exhaust passage where the temperature of the exhaust gas becomes low, the temperature rise (activation) of the catalyst becomes faster. In addition, the amount of exhaust gas flowing into the HC adsorbent is all in the prior art, whereas, in each embodiment of the invention, it is only partial and thus the temperature rise of the HC adsorbent is delayed, so that the start of desorption of the adsorbed HC is generally delayed. In consequence, the catalyst can fully increase in temperature during that time without relying on an auxiliary heating means.

However, since the HC adsorbent gradually increases in temperature in absorbing the heat of the exhaust gas little by little, the amount of HC adsorbed by the adsorbent is eventually exceeded by that of the HC desorbed from the adsorbent but, at this point, the catalyst has already keen activated by increasing temperature through the absorption of heat of the exhaust gas, so that the desorbed HC is purified by the catalyst and is not discharged outside. In addition, since most of the exhaust gas does not pass through the HC adsorbent, there is no possibility of reduced engine output due to increased exhaust resistance.

In the second embodiment of the invention, the HC adsorbent is adapted to adsorb HC in the exhaust gas in a temperature range where the catalyst is inactive, and to desorb the adsorbed HC mainly in the activation temperature range of the catalyst and, as is apparent from the above description, since the HC adsorbent is adsorbing the HC in the exhaust gas after engine startup and before the catalyst reaches the activation temperature, HC can be prevented from passing through the inactive catalyst and being released into the atmosphere still not treated. Accordingly, a time margin can be obtained for causing the catalyst temperature to rise, thereby to activate the catalyst while the HC adsorbent is adsorbing HC.

Similarly, in the third embodiment, the HC adsorbent is made by causing a heat-resistant carrier to carry a zeolite adsorbent, but in every embodiments of the exhaust gas purification apparatus of the invention, the HC adsorbent is of a construction in which it is relatively difficult to absorb the heat of the exhaust gas as described above, and, accordingly, no heat resistance problem occurs if a zeolite adsorbent of a relatively low heat resistance is used, whereby it is possible to take full advantage of the excellent HC adsorption performance of the zeolite HC adsorbent.

In the fourth embodiment, since there is provided a rectifier means for exhaust gas of various shapes between the exhaust ports and the HC adsorbent, the portion of exhaust gas of large specific gravity containing many HC particles is guided by the rectifier means to reach the HC adsorbent, and HC particles can be efficiently trapped by the HC adsorbent.

In the fifth embodiment, since a construction is given for positively cooling the HC adsorbent by the use of a cooling means, the temperature rise of the HC adsorbent becomes more gradual and the timing of desorption of the adsorbed HC from the HC adsorbent is delayed, so that the time margin for allowing the catalyst to increase in temperature becomes larger accordingly. Consequently, an auxiliary heating means for rapidly activate the catalyst is unnecessary, and the power consumed by such means can be saved.

In the sixth embodiment, since a cover means is provided to cover the HC adsorbent for preventing the exhaust gas from directly striking the HC adsorbent, the heat of the exhaust gas is difficult to be absorbed by the HC adsorbent, by which an effect similar to the fifth embodiment can be obtained.

In the seventh embodiment, an EGR passage is connected downstream from the HC adsorbent and an EGR control valve for opening/closing the EGR passage is provided in part of the EGR passage, and, normally, the EGR control valve is closed because EGR is not performed when the engine starts up and there is no exhaust gas flow passing through the EGR passage, so the HC adsorbed on the HC adsorbent is temporarily held by the adsorbent.

Then, engine warmup proceeds and EGR begins with the lapse of time and, when the EGR control valve opens to cause an exhaust gas flow in the EGR passage, the adsorbent is heated by the exhaust gas and the HC adsorbed on the adsorbent starts to desorb therefrom. The HC having desorbed from the adsorbent flows into the intake passage along with the exhaust gas (or EGR gas) passing through the EGR passage, mixes with the fuel mixture, and is burnt in the combustion chamber of the engine, whereby it is treated.

In addition the exhaust gas temperature increases for a high load, but, normally, EGR is not performed at this stage, and thus the EGR control valve closes to prevent the exhaust gas from passing through the EGR passage, whereby the adsorbent temperature is kept relatively low. Accordingly, it is completely possible to use an adsorbent, such as zeolite, having a relatively low heat-resistance.

The air-fuel ratio of the engine varies when the EGR control valve opens and the HC having desorbed from the adsorbent is purged into the intake passage of the engine, but, in the eighth means, the air-fuel ratio of the engine is controlled through feedback by an output signal of an air-fuel ratio sensor provided in the exhaust passage or EGR passage upstream from the adsorbent, for instance, the control cycle of the air-fuel ratio of the engine is varied in synchronized with the opening/closing control of EGR control valve, so that the large variation of the air-fuel ratio can be prevented and no problem arises.

In the ninth embodiment, since the HC adsorbent is placed in the junction of the exhaust manifold, the HC adsorbent can efficiently trap the HC in the exhaust gas and no special container need be provided for the HC adsorbent.

In the tenth embodiment, further developed from the ninth embodiment, wherein a communication path in the HC adsorbent allows communication among spaces forward with respect to the blow-down direction of the exhaust gas flowing from each exhaust port of a plurality of cylinders having different exhaust timing in the internal combustion engine, the pressure at one of the two ends of the communication path is higher than that at the other one because the exhaust timing of the plurality of cylinders differs, and thus the pressure difference causes an exhaust gas flow passing through the communication path while reversing, whereby the HC is efficiently absorbed when it passes through the communication path in the HC adsorbent.

In the eleventh embodiment, since a throat is provided in the communication path described above, an amount of exhaust gas passing through the communication path can be adjusted by appropriately setting the throat, thereby for controlling the amount of HC to be adsorbed and the degree of temperature rise.

Further, in the twelfth embodiment of the invention, since the HC purification catalyst is carried in HC adsorbent heated to a relatively high temperature, the HC desorbed from the HC adsorbent can be immediately purified by the catalyst. In addition, the catalyst is carried in the HC adsorbent which is heated to a relatively high temperature, so that it is quickly activated and can purify the HC at an early stage.

In the thirteenth embodiment, since the HC adsorbent is comprised of a plurality of materials having different specific heat and the HC purification catalyst is carried in a carrier made of a material of small specific heat, the catalyst is also activated and purifies the HC at an early stage because the material, having a small specific heat, increases in temperature relatively quickly.

In the fourteenth embodiment, as a specific example of the plurality of materials having different specific heat in the thirteenth embodiment, the carrier of the adsorbent is a ceramic and the carrier of the HC purification catalyst is a heat-resistant metal such as stainless steel. The typical action as described above is thus produced.

DESCRIPTION OF THE PREFERRED EMBODIMENTS

Figure 1:
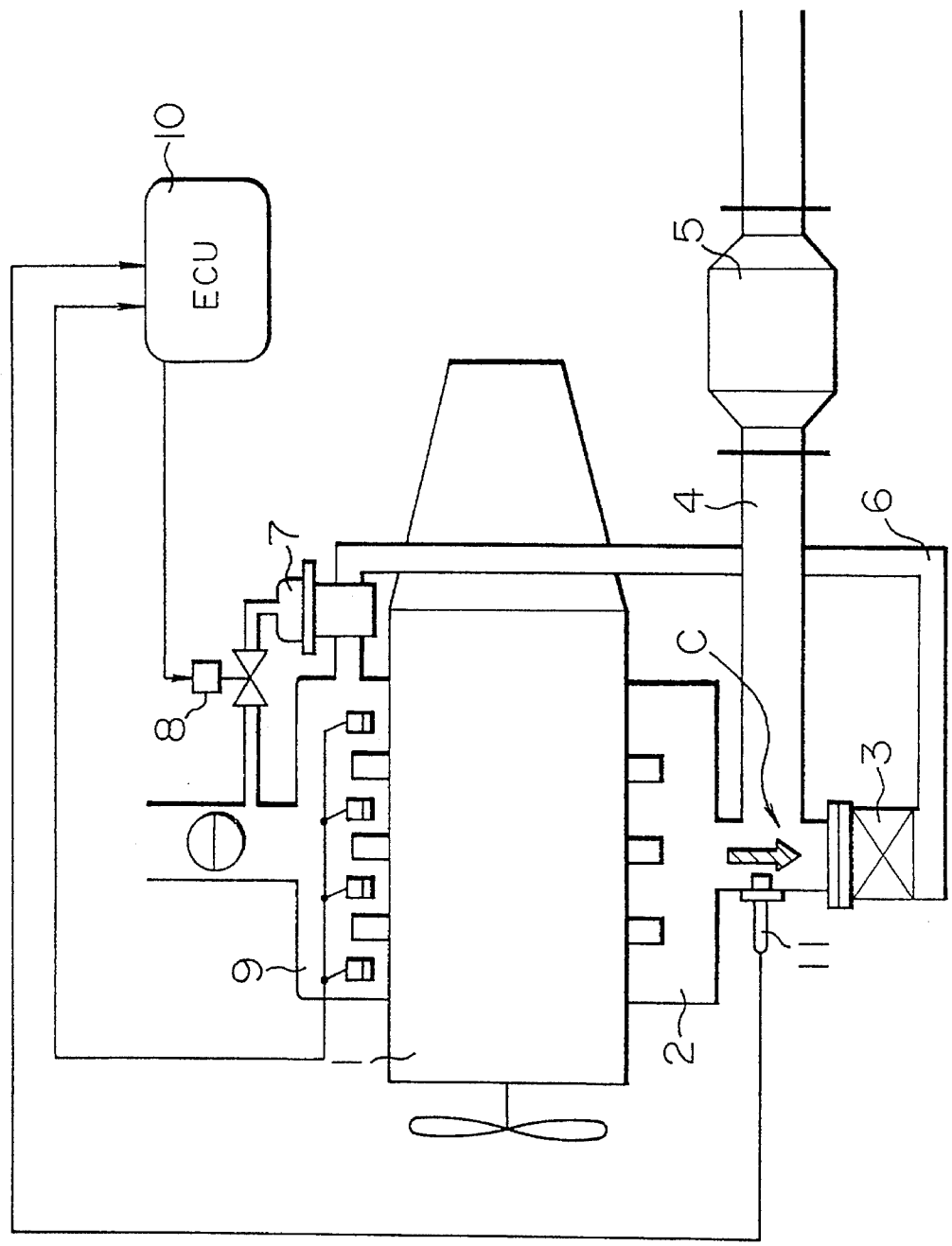
FIG. 1 is a partly sectional plan view which conceptually shows the construction of a gasoline engine including an exhaust gas purification apparatus of the first embodiment of the invention.

The invention will be described hereinafter in detail by the first embodiment shown in FIG. 1. The reference numeral 1 denotes a gasoline engine, and 2 denotes an exhaust manifold. In the case shown, the exhaust passage connecting the exhaust manifold 2 to exhaust pipe 4 bends 90 degrees at portion C, to form a branched portion. The reference numeral 3 denotes a HC adsorbent which is made by applying zeolite and the like to a carrier of a honeycomb structure, which is usually structured by alumina or metal foil. The adsorbent 3 is to trap HC which is discharged from the exhaust manifold 2 along with the exhaust gas at startup and brought into collision with the adsorbent 3 by inertia.

Figure 2:
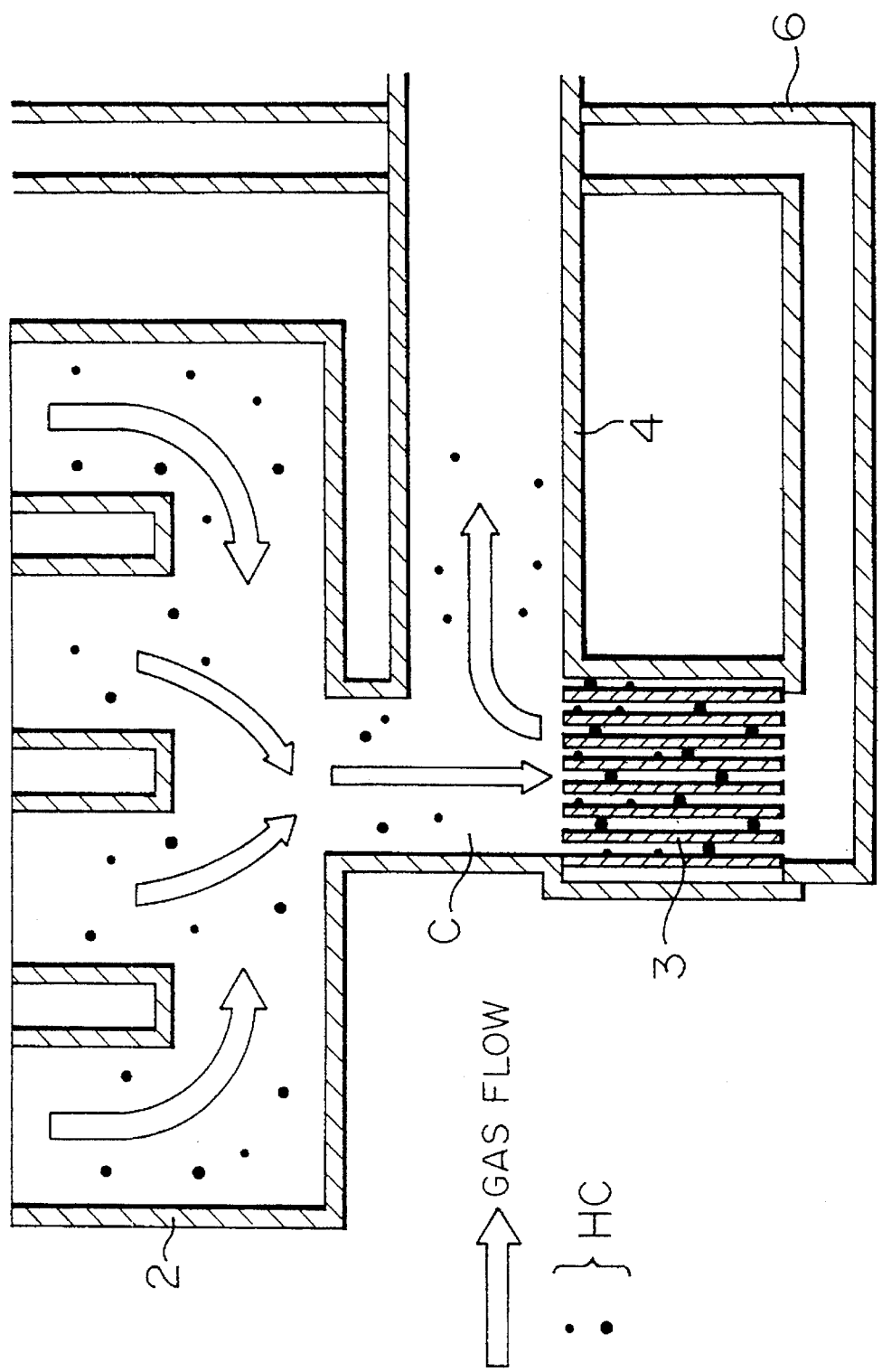
FIG. 2 is a diagram showing the HC trap action in the first embodiment.

The structure and action of this part is described in greater detail using FIG. 2. The HC adsorbent 3 is provided in an extended portion downstream in a straight traveling direction of the exhaust gas flowing from the exhaust manifold 2, and the exhaust pipe 4 branching perpendicularly is connected immediately before the HC adsorbent 3. A downstream part of the HC adsorbent 3 is described later. After engine 1 starts, the exhaust gas discharged from the exhaust port of each cylinder joins at a junction of the exhaust manifold 2, travels straight in the direction of the HC adsorbent 3 (in the blow-down direction of the exhaust gas), and strikes the surface of the adsorbent 3. At this point, since an EGR passage downstream from the adsorbent 3 is closed by an EGR valve 7 as described later, the exhaust gas makes a turn at the bent portion C to flow into the exhaust pipe 4, and is discharged outside through an oxidation catalyst 5.

When the exhaust gas flow strikes the adsorbent 3, HC of a relatively small particle size contained in the exhaust gas reverses along with the exhaust gas having a small specific gravity and is discharged into the exhaust pipe 4 from the bent portion C, but HC of a relatively large particle size such as fuel particles enters the adsorbent 3 by inertia and is adsorbed by the adsorbent 3. In this way, it is possible to trap about 40 to 60% of the HC discharged when the engine 1 is started. At this point, most exhaust gas does not enter the adsorbent 3, but smoothly makes a turn at the bent portion C and flows to the oxidation catalyst 5 provided in the exhaust pipe 4, and, thus, an amount of heat given to the adsorbent 3 is small and the temperature rise in the adsorbent 3 is gradual, so that the timing when the adsorbed HC starts desorption is later than the prior art in which all exhaust gas passes through the HC adsorbent 3. Conversely, the temperature rise in the oxidation catalyst 5 becomes fast, so that the catalyst is activated to purify HC or the like at an early stage without an auxiliary heating means. Furthermore, since almost exhaust gas flows without passing through the HC adsorbent 3, engine output is not reduced due to the ventilation resistance of the HC adsorbent 3 as in the prior art.

Figure 3:
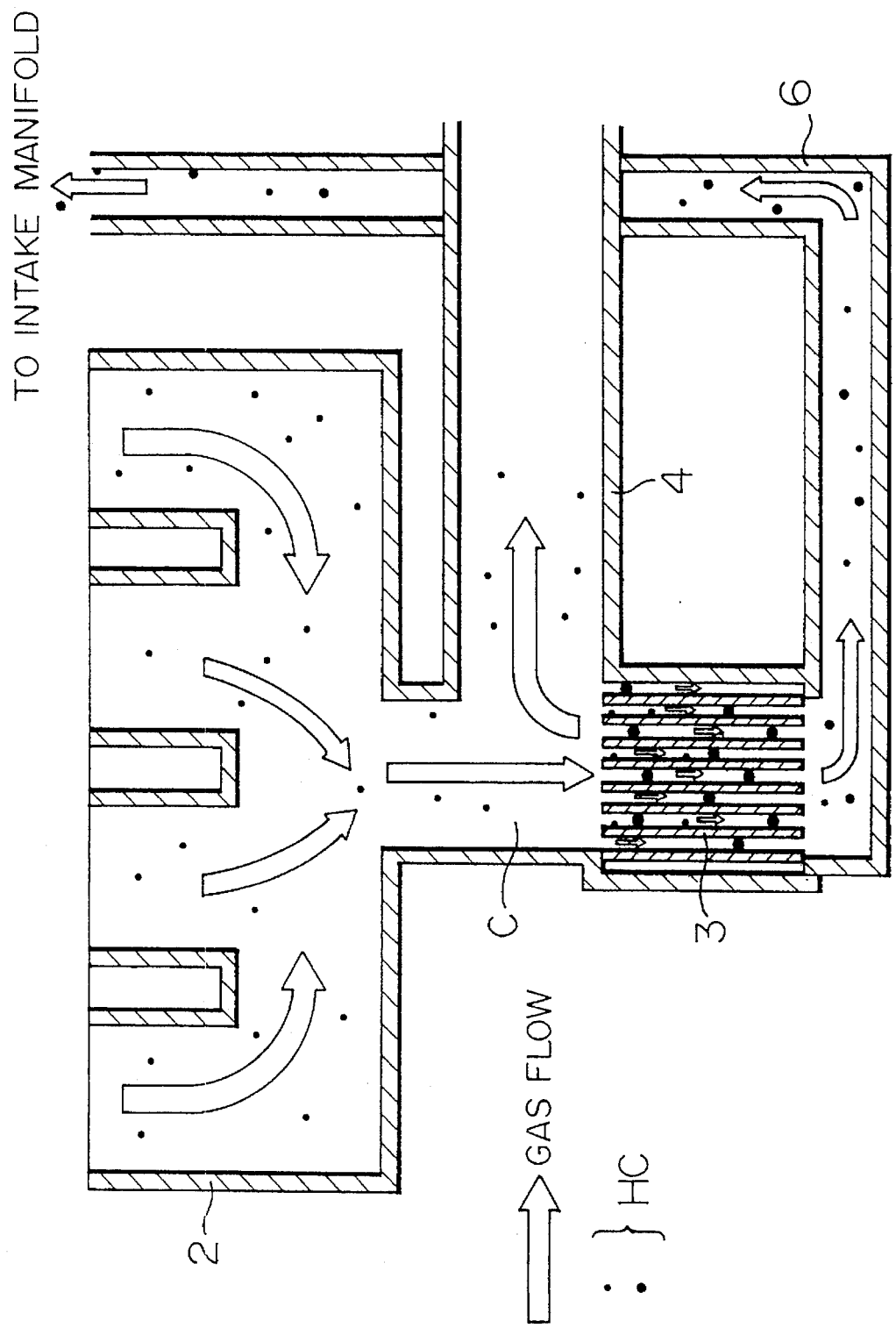
FIG. 3 is a diagram showing the HC purge action in the first embodiment.

The purging of trapped HC from the HC adsorbent 3 is described using FIG. 3. An EGR pipe 6 is connected downstream from the HC adsorbent 3, and the downstream portion of the EGR pipe 6 is connected to an intake manifold 9 via the EGR control valve 7 as shown in FIG. 1. When the operation condition of the engine satisfies an EGR condition similar to the conventional case, a vacuum switching valve (VSV) 8 is driven by an electronic control unit (ECU) 10 to open the EGR control valve 7, and the intake manifold 9 and HC adsorbent 3 communicate with each other.

Figure 4:
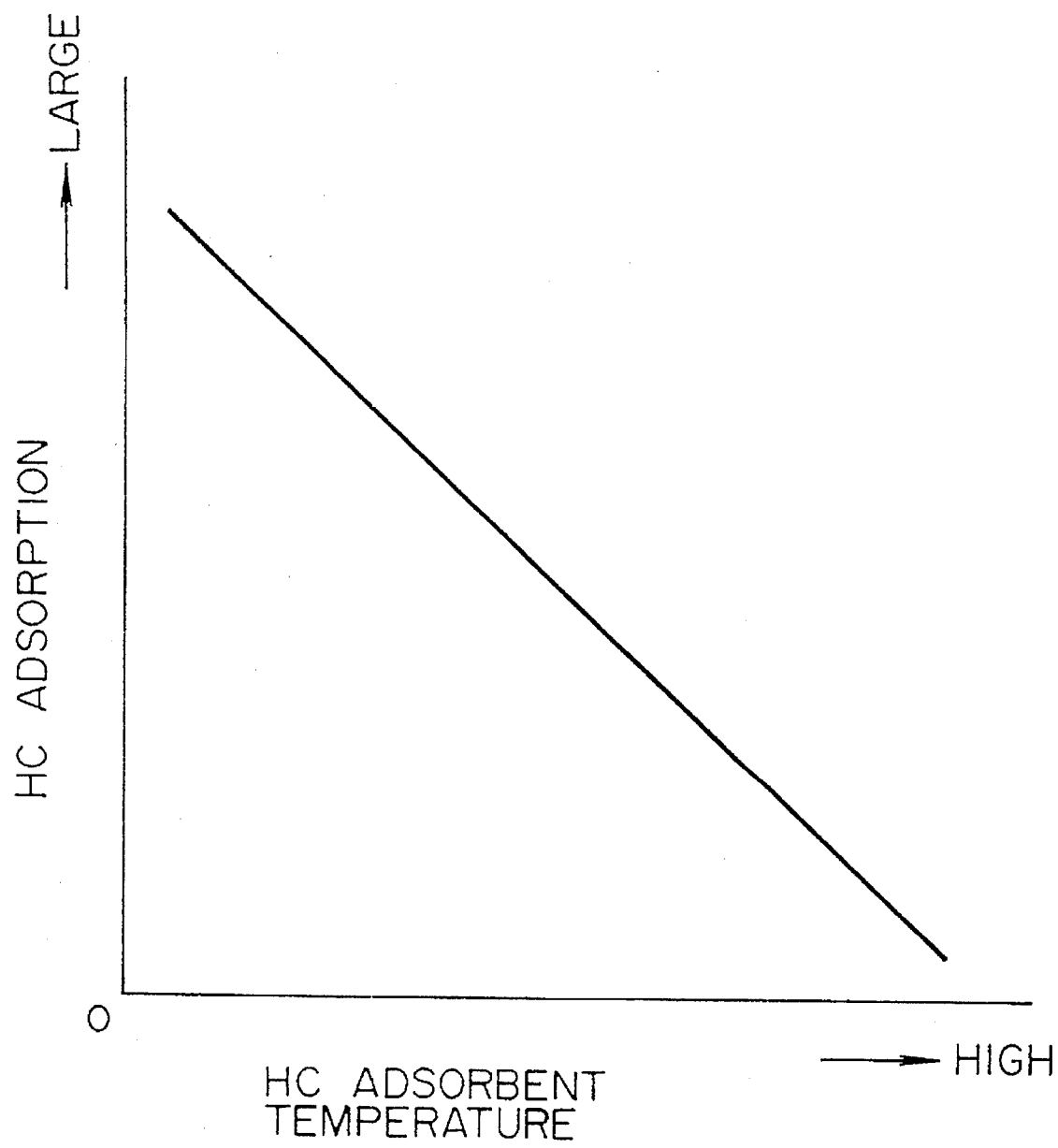
FIG. 4 is a graph showing the relationship between the adsorbent temperature and the HC adsorption in a HC adsorbent.

As a result, part of the exhaust gas begins to flow through the HC adsorbent 3, causing the HC adsorbent to be heated by the heat of the exhaust gas, and desorption of the HC trapped in the adsorbent 3 begins. This desorption is produced by the characteristics of the HC adsorbent 3 in that the adsorption of HC decreases as the adsorbent temperature increases as shown in FIG. 4.

The desorbed HC is taken into an intake manifold 9 of the engine 1 along with the EGR gas flow for afterburning in the combustion chamber. In the above action, the HC trapped in the HC adsorbent 3 can be smoothly purged. In addition, since the residual HC in the adsorbent 3 can be completely purified if an oxidation catalyst such as Pt or Pd is carried in the adsorbent 3, clogging of the pores of the adsorbent 3 can be prevented to increase its durability.

However, at EGR, as described above, the air-fuel ratio of the intake gas can be made rich by the HC desorbed from the adsorbent 3, degrading the performance of HC purification in the oxidation catalyst 5. In this case, if feedback control of fuel injection amount is done by an $O_2$ sensor (air-fuel ratio sensor) 11 on the exhaust manifold 2 so that the air-fuel ratio (A/F) becomes equal to the stoichiometric air-fuel ratio, degradation of catalyst purification can be prevented.

Figure 5:
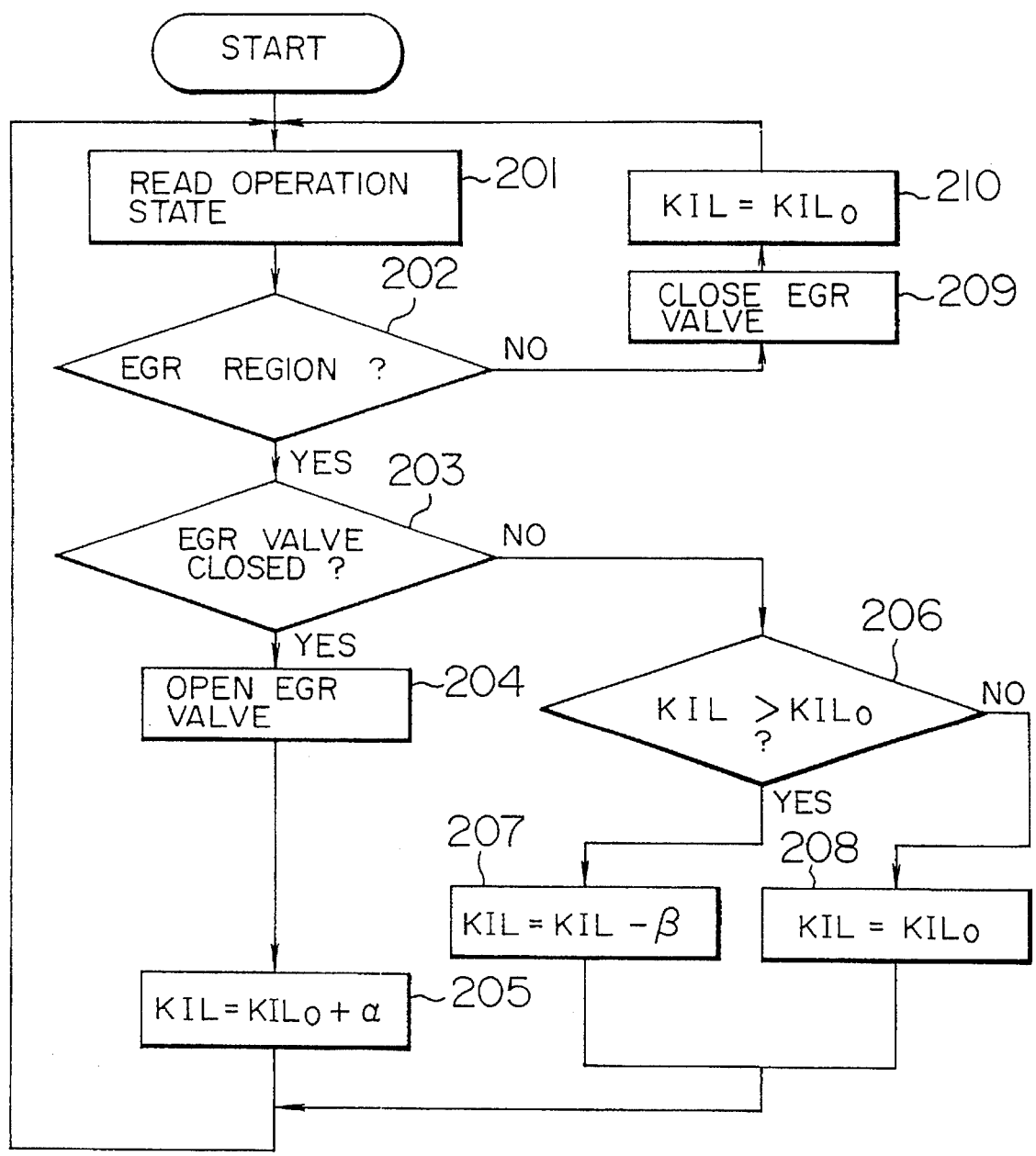
FIG. 5 is a flowchart for explaining A/F control at HC purging in the first embodiment.

In this case, when the variation of the intake air-fuel ratio becomes large just after opening of the EGR control valve 7 and followup is delayed for conventional $O_2$ feedback control, it is only needed to shorten the feedback cycle by increasing the integration constant of $O_2$ feedback constants. A flowchart in this case is shown in FIG. 5. In step 201, the operation state is read and it is judged in step 202 whether it is EGR. If so, it is judged in step 203 whether the EGR control valve 7 is closed and if it is, EGR control valve 7 is opened in step 204. Then, in step 205, for the integration constant KIL of $O_2$ feedback constants for changing to the lean side, a new KIL is setting by adding α to $KIL_0$ defined in step 201, and the process returns to step 201.

Further, if the EGR valve is already open in step 203, the process proceeds to step 206 where it is judged whether the current KIL is larger than $KIL_0$. If so, a new KIL is set by subtracting β from the current KIL in step 207, and the process returns to step 201. If KIL is not greater than $KIL_0$, $KIL=KIL_0$ is provided in step 208, and the process returns to step 201. If, in step 202, it is judged that the operation state is not an EGR region, the EGR control valve 7 is closed in step 209, $KIL=KIL_0$ is provided in step 210, and the process returns to step 201.

Figure 6:
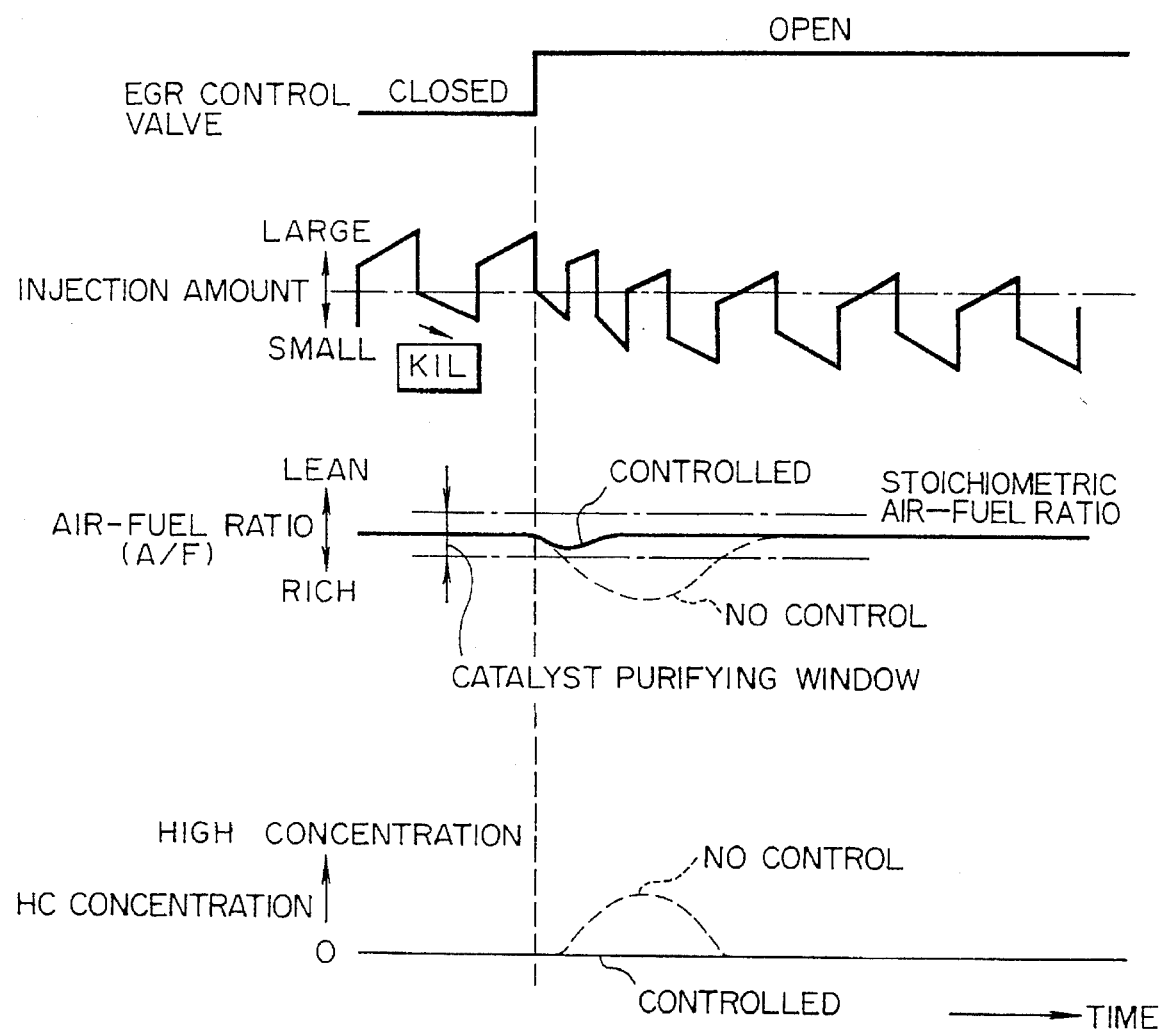
FIG. 6 is a timing chart showing the advantage of the A/F control shown in FIG. 5.

By such control, as shown in FIG. 6, when the EGR control valve 7 is opened, the A/F disturbed by the desorbed HC can be restored to the stoichiometric air-fuel ratio at an early stage, whereby HC purification performance in the oxidation catalyst 5 can be kept at optimum condition. In addition, to shorten the $O_2$ feed-back cycle as described above, skip or delay time may be changed instead of the integration constant KIL.

As is apparent from the above description, in accordance with the exhaust gas purification apparatus of the first embodiment of the invention, the HC trapped by the adsorbent 3 is purged with the EGR gas at EGR in the engine 1, and again burnt in the combustion chamber of the engine 1 and therefore it is not necessary to use a special catalyst or the like for purifying the desorbed HC. In addition, since no exhaust gas for purging flows in the adsorbent 3 because EGR stops at a high load, the maximum temperature of the adsorbent 3 is low compared to the prior art wherein the adsorbent is provided in the exhaust pipe 4 through which all exhaust gas passes, enabling the use of even a zeolite adsorbent having a low heat resistance.

Figure 7:
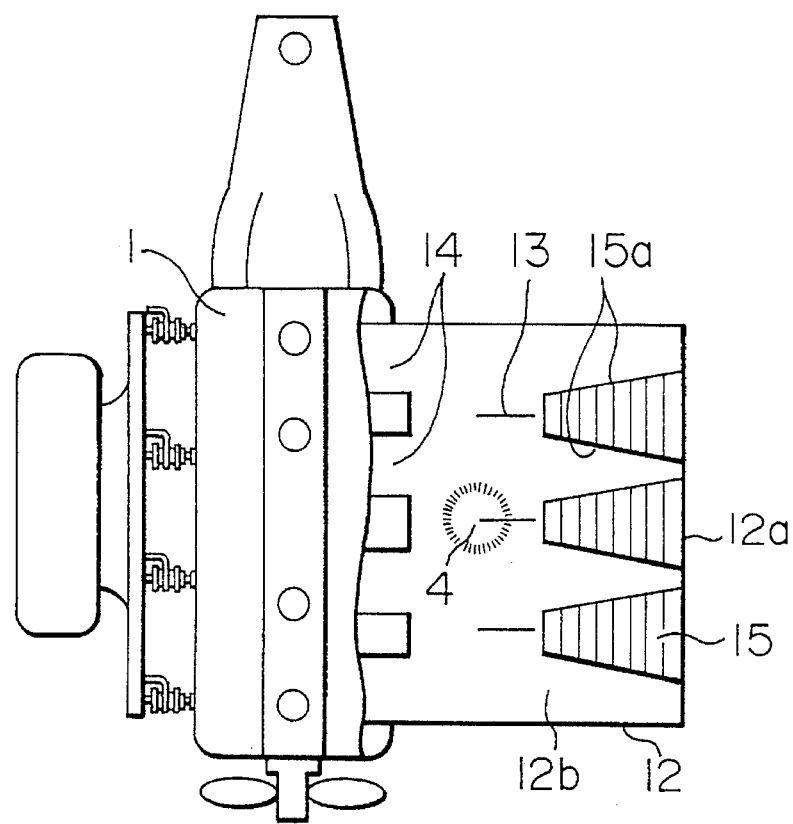
FIG. 7 is a partly sectional plan view showing the exhaust gas purification apparatus of the second embodiment.
Figure 8:
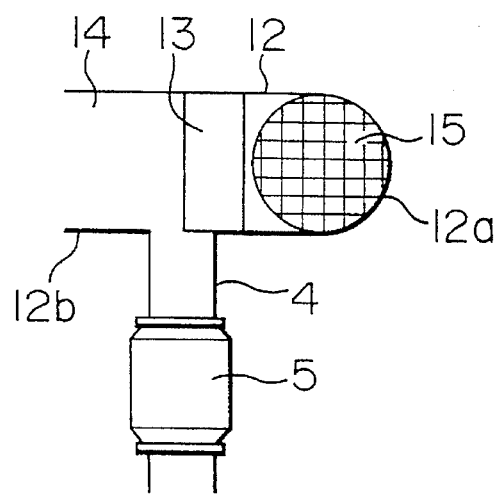
FIG. 8 is a cutaway side view showing part of the exhaust gas purification apparatus shown in FIG. 7.

In FIGS. 7 and 8, a structure of the exhaust gas purification apparatus as the second embodiment of the invention is shown. FIG. 7 is a plan view and FIG. 8 is a front view. To the gasoline engine 1 is attached an adsorption box 12 also acting as an exhaust manifold, in which several parallel rectifier blades 13 are provided to face the direction of the flow of the exhaust gas flowing from exhaust ports 14 of the engine 1 (the blow-down direction of the exhaust gas).

The reference numeral 15 denotes the HC adsorbent made of a carrier of a honeycomb structure usually structured by alumina (ceramics) or metal foil, which is coated with zeolite or the like, and contained in the adsorption box 12 and fixed on one end wall 12a. A bottom surface 12b of the adsorption box 12 has an opening of the exhaust pipe 4, whereby the flow path of the exhaust gas flowing from exhaust ports 14 into the adsorption box 12 bends 90 degrees. To the exhaust pipe 4 is connected a catalyst 5 as in the first embodiment.

Figure 9:
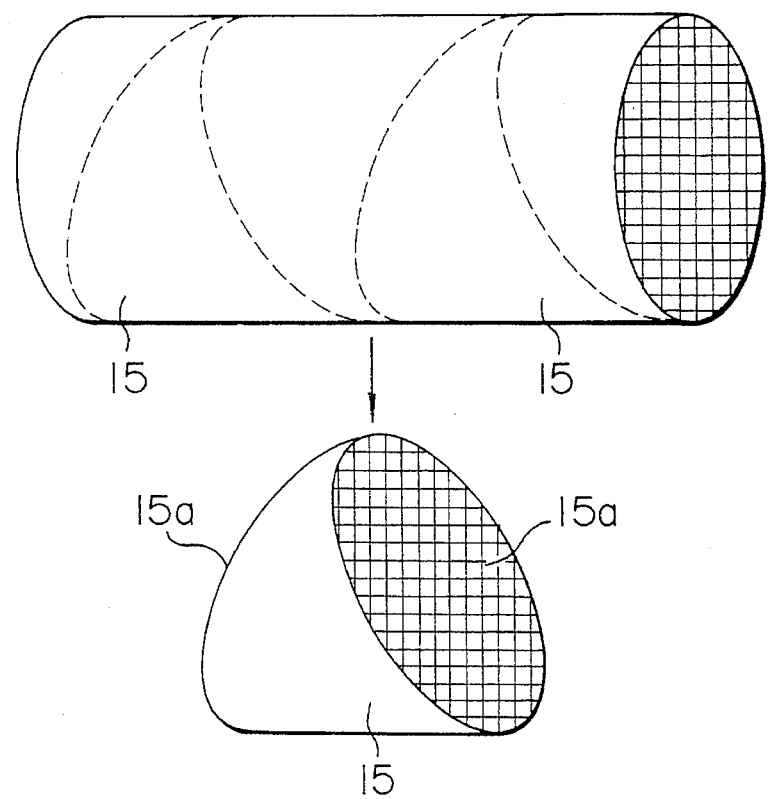
FIG. 9 is a perspective view for demonstrating the cutting of the adsorbent.

The adsorbent 15 employed in the exhaust gas purification apparatus of the second embodiment has surfaces 15a sloping in the blow-down direction of the exhaust gas from exhaust ports 14. The sloping surfaces 15a in the adsorbent 15 are shown in FIG. 9. In this example, the stock of a honeycomb adsorbent generally formed in a cylindrical shape and having pores in the longitudinal direction thereof is alternately cut slantwise, as shown by dashed lines, thereby making adsorbents 15 as pieces each having a pair of sloping surfaces 15a. In the second embodiment, an arrangement is provided in which the rectifier blades 13 is disposed so as to connect with an upstream end formed by the pair of sloping surfaces 15a of the adsorbent 15.

With such construction of the exhaust gas purification apparatus of the second embodiment, a relatively large amount of HC discharged at engine cold-starting is guided by rectifier blades 13 and efficiently strike the adsorbents 15, and enters the pores of the honeycomb adsorbents 15 and is trapped through adsorption by an adsorbent such as zeolite applied on adsorbents 15. In the second embodiment, adsorbents 15 have slopes in the direction of the exhaust gas and the pairs of sloping surfaces 15a are respectively opposed to exhaust ports 14, and thus there is an advantage that the contact area of adsorbents 15 and the exhaust gas can be made large to increase the adsorption of HC.

Since the pair of sloping surfaces 15a are respectively opposed to the exhaust ports 14 of the two adjacent cylinders of the engine 1, a slight amount of exhaust gas flows between the pair of sloping surfaces 15a across the adsorbent 15 by an instantaneous pressure difference due to exhaust ripples in the two cylinders. This also contributes to increased contact area between adsorbents 15 of the second embodiment and the exhaust gas, leading to increased HC adsorption.

Further, since the end face of the adsorbent 15 is heat-exchangeable with outside air through the end wall 12a of the adsorption box 12 contacting outside air, the temperature rise in the adsorbent 15 is suppressed, whereby HC can be prevented from being desorbed and held until catalyst 5 reaches the purification temperature (until it is activated). In addition, when HC desorption begins, the desorbed HC is promptly purified by the oxidation catalyst 5 downstream in the exhaust pipe 4, and thus is not discharged into outside air.

Figure 10:
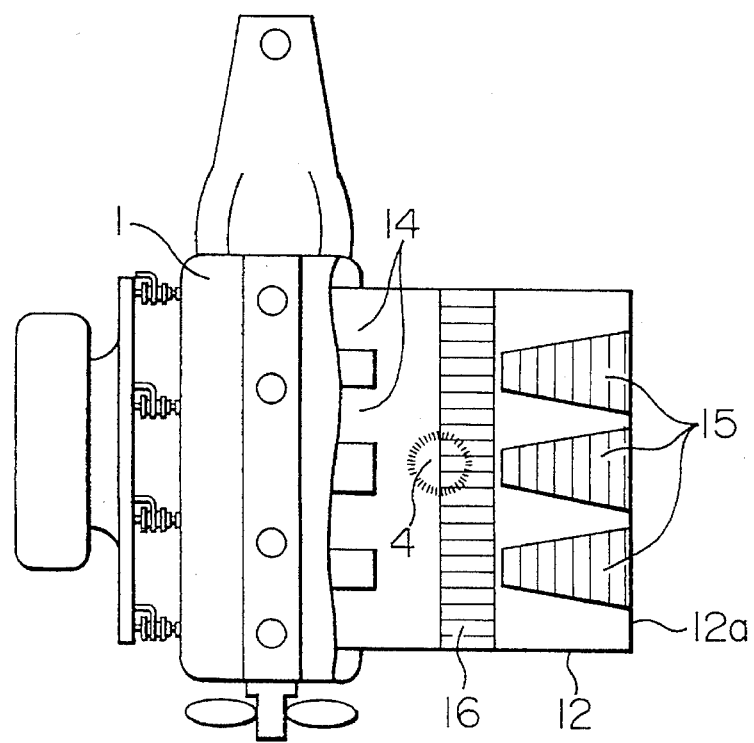
FIG. 10 is a partly sectional plan view showing the exhaust gas purification apparatus of the third embodiment.

FIG. 10 shows a third embodiment of the invention, and a duplicate explanation is omitted by assigning the same reference numerals to the portions common to the above described second embodiment. The third embodiment is characterized in that, in the adsorption box 12, a honeycomb rectifier block 16 is provided, instead of the plate-like rectifier blades 13 in the second embodiment, between exhaust ports 14 and adsorbents 15 so that the direction of pores of the honeycomb rectifier block aligns with the blow-down direction of the exhaust gas. Adsorbents 15 are similar to those of the second embodiment.

In the third embodiment, the exhaust gas flowing from exhaust ports 14 in the blow-down direction of the exhaust gas passes through the many relatively fine pores of the rectifier block 16 and come into contact with the adsorbents 15, whereby the HC component is adsorbed. HC having a large particle size is also directly trapped by the honeycomb rectifier block 16 itself. The trapped HC is carried in the air flow passing through the rectifier block 16 and sent into more inner adsorbents 15. Accordingly, the possibility of HC flowback to exhaust ports 14 after passing through the rectifier block 16 is low, and the HC particles are reliably trapped by adsorbents 15 until desorbed. In addition, a catalyst may be installed on the rectifier block 16, thereby allowing the rectifier block 16 to both rectify and purify the exhaust gas.

Figure 11:
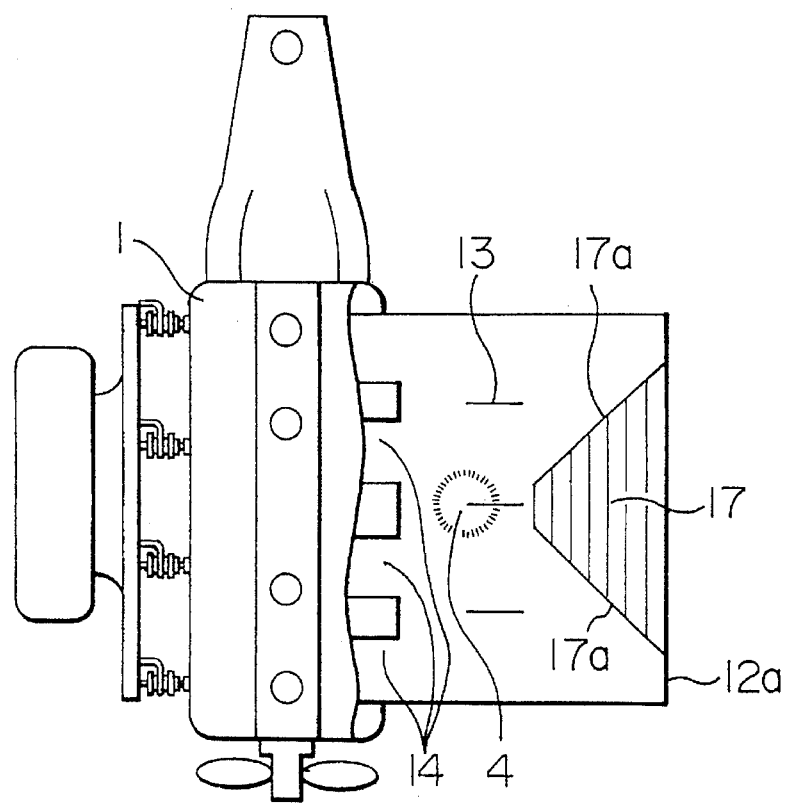
FIG. 11 is a partly sectional plan view showing the exhaust gas purification apparatus of the fourth embodiment.

FIG. 11 shows a fourth embodiment of the invention, which is different from the above described second embodiment in that a single block-shaped adsorbent 17 is used instead of the piece-shaped adsorbents 15 as in the second and third embodiments. The block-shaped adsorbent 17 of the fourth embodiment is cut out from the honeycomb adsorbent as shown in FIG. 9, but with different cutting angle and interval. Since the block-shaped adsorbent 17 has a pair of large sloping surfaces 17a and many pores are formed between these surfaces, the exhaust gas can enter the block-shaped adsorbent 17 by an instantaneous pressure difference due to the exhaust ripple between cylinders, or the like, whereby the HC particles are adsorbed by an adsorbent such as zeolite with which the block-shaped adsorbent 17 is coated. Although rectifier blades 13 are also used in this embodiment, it should be understood that these may be replaced with other rectifying means such as the rectifier block 16 as in the third embodiment of FIG. 10.

Figure 12:
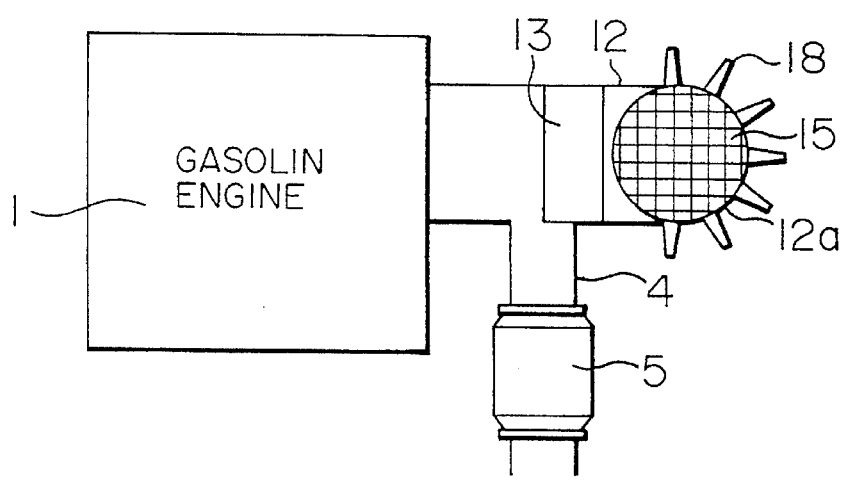
FIG. 12 is a cutaway side view showing part of the exhaust gas purification apparatus of the fifth embodiment.

FIG. 12 shows a fifth embodiment of the invention. The fifth embodiment corresponds to further improvement of the exhaust gas purification apparatus of the second or fourth embodiment, wherein cooling fins 18 are provided on the end wall 12a of the adsorption box 12 in these embodiments. By controlling the temperature rise of the HC adsorbent 15 or 17 by heat dissipation of cooling fins 18, the desorption of HC from the adsorbent is prevented from starting before the catalyst 5 is activated.

Figure 13:
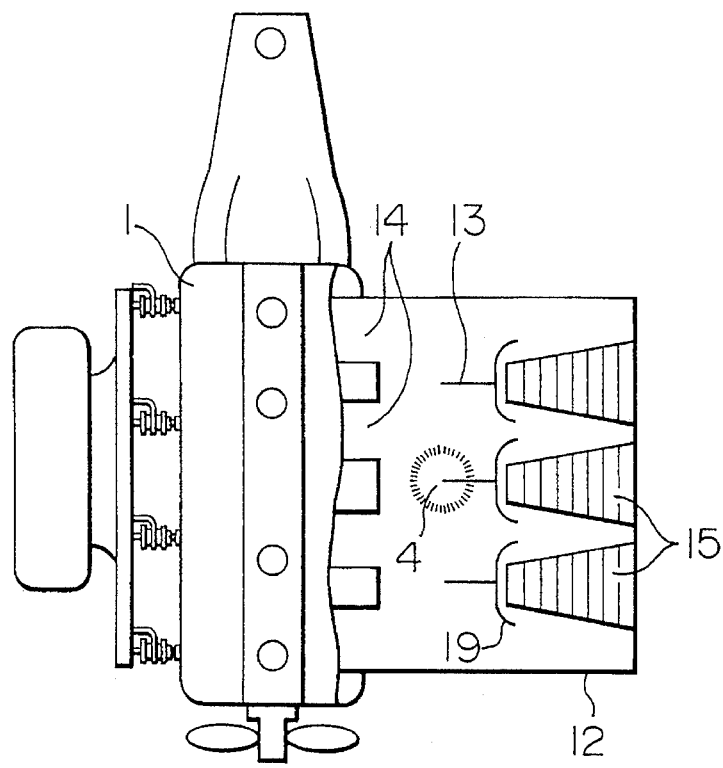
FIG. 13 is a partly sectional plan view showing the exhaust gas purification apparatus of the sixth embodiment.

FIG. 13 shows a sixth embodiment of the invention. The embodiment also improves the second or fourth embodiment, and it is characterized in that a relatively large eaves-like cover 19 is attached at the upstream end of the HC adsorbent 15 or 17. The provision of the cover 19 increases the flow coefficient of the exhaust gas flow of the blow-down direction from the exhaust ports 14 to adsorbents 15, and decreases the flow coefficient of the flow in the opposite direction, thereby increasing an amount of the exhaust gas flowing into adsorbents 15. Thus, the adsorption of HC by adsorbents 15 can be increased.

Figure 14:
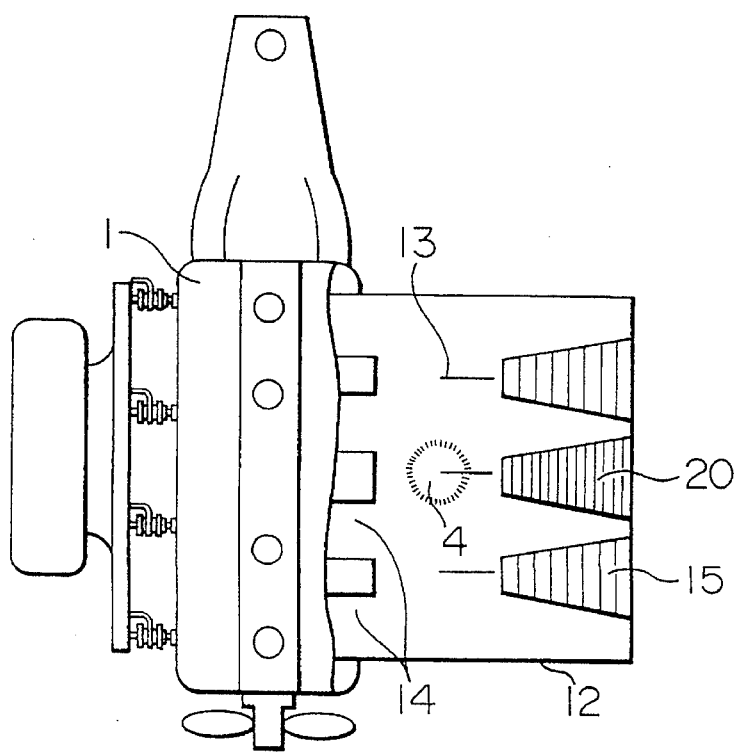
FIG. 14 is a partly sectional plan view showing the exhaust gas purification apparatus of the seventh embodiment.

FIG. 14 shows a seventh embodiment of the invention. In this embodiment, taking advantage of the fact that the largest-amount of the exhaust gas strikes a central one of three HC adsorbents 15 which are provided in parallel forward with respect to the blow-down direction of the exhaust gas from the exhaust ports 14, as in the second embodiment, etc., and thus the temperature rises fast in that one, an oxidation catalyst is also carried in that one in addition to a HC adsorbent such as zeolite. In addition, instead of the catalyst carrying the adsorbent 20, a catalyst carrier may be used in which only a catalyst is carried, with no adsorbents.

Instead of allowing a catalyst to be carried in the whole of, for instance, the central adsorbent 15 which has the fastest temperature rise because a relatively large amount of the exhaust gas strikes it, as in the seventh embodiment, a portion of the surface of the adsorbent 15 having a particularly fast temperature rise may be selected so that a catalyst is carried only in that portion. This is described as the catalyst carrying adsorbent 21 of an eight embodiment.

Figure 15:
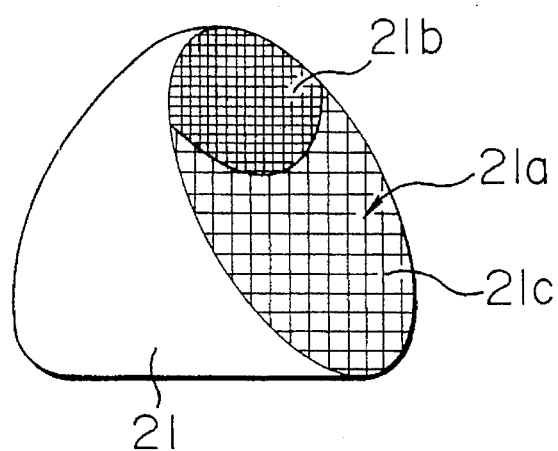
FIG. 15 is a perspective view showing the adsorbent carrying catalyst of the eighth embodiment.
Figure 16:
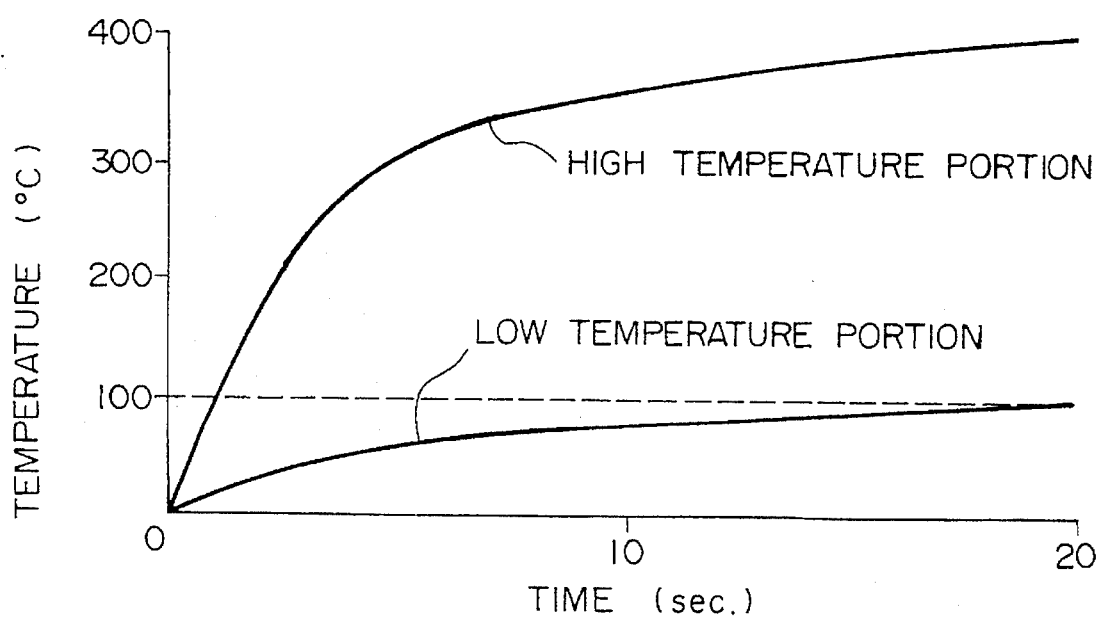
FIG. 16 is a graph showing a temperature difference depending on parts in the adsorbent.

In FIG. 15, a HC adsorbent 21 is substantially the same as the HC adsorbent 15 in the second embodiment as a stock. A relatively high temperature portion of the pair of sloping surfaces 21a is shown as a high-temperature portion 21b, and a relatively low portion is shown as a low-temperature portion 21c. Further, FIG. 16 shows temperature changes in the high-temperature portion 21b and low-temperature portion 21c during 20 seconds past from the engine start. As seen from FIG. 16, the temperature does not exceed 100° C. for 20 seconds after the engine start in the low-temperature portion 21c, whereas it largely exceeds 100° C. with an elapse of the same time in the high-temperature portion 21b. The cause of such a difference is that the distances from the exhaust ports 14 and amounts of the exhaust gas striking the adsorbent 21 as seen per unit volume differ for the high-temperature potion 21b and low-temperature portion 21c.

Figure 17:
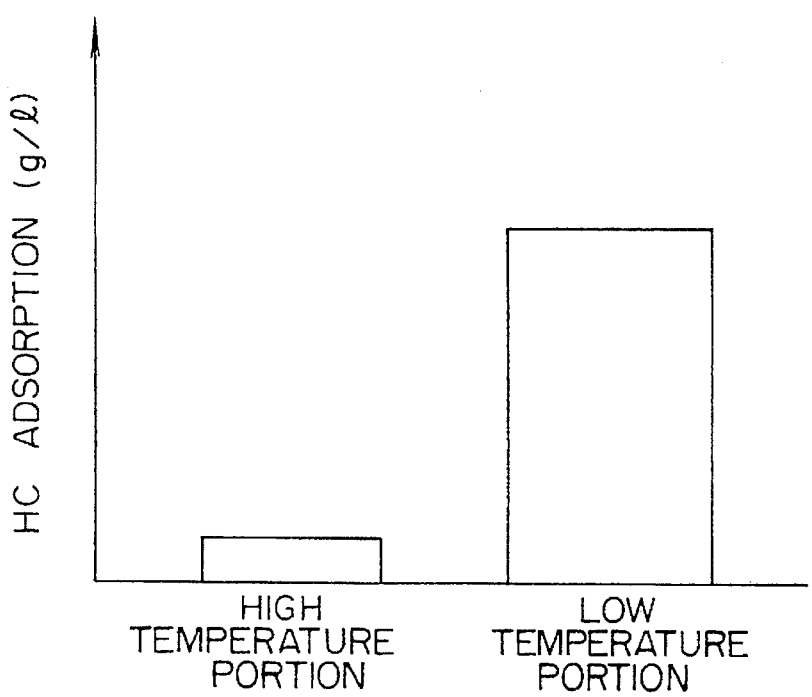
FIG. 17 is a diagram showing a HC adsorption difference depending on parts in the adsorbent.
Figure 18:
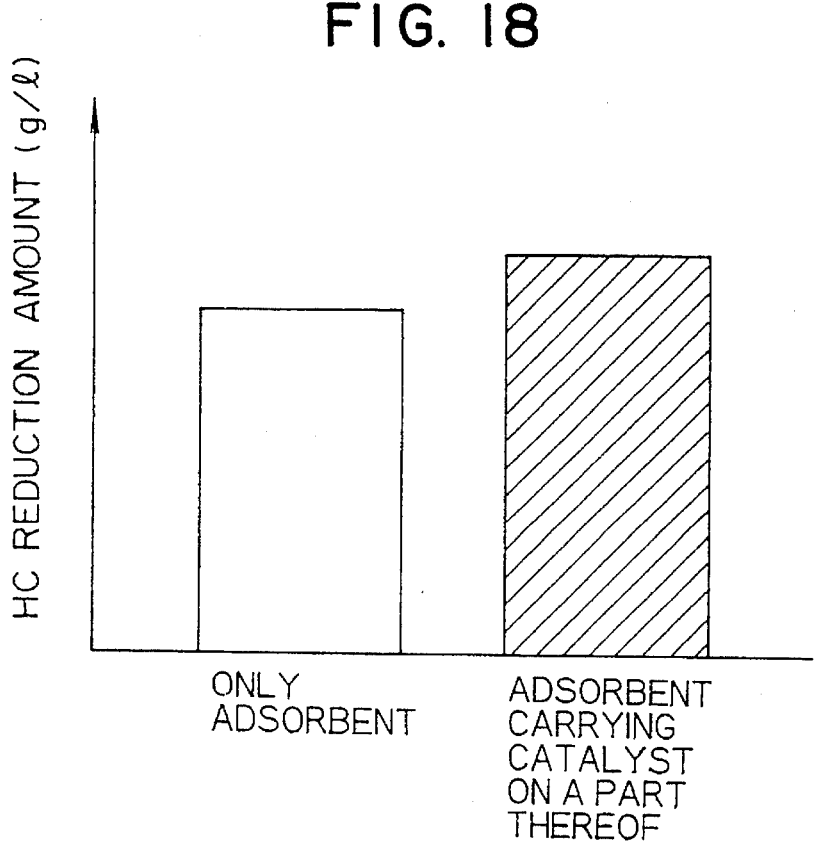
FIG. 18 is a diagram showing the advantage of the eighth embodiment.

Since temperature is considerably different depending on the part even in one HC adsorbent 21 as described above, HC adsorption also differs depending on the part as shown in FIG. 17. In the high-temperature portion 21b, an amount of HC to be desorbed becomes greater than an amount of HC to be adsorbed when the temperature exceeds 100° C., and an average HC adsorption of the high-temperature portion 21b is extremely low compared to that of the low-temperature portion 21c, thus causing the catalyst metal to be carried only in the high-temperature portion 21b of low HC adsorption, the HC striking the high-temperature portion 21b and the HC separated from the low-temperature portion 21c can be purified at an early stage. FIG. 18 shows an effect of the eighth embodiment, and in the adsorbent 21 in which a catalyst is carried in the high-temperature portion 21b of the adsorbent 21, an obvious improvement due to the early purification by the catalyst is seen in reduction of an amount of HC discharged outside as compared with a only HC adsorbent 15.

Figure 19:
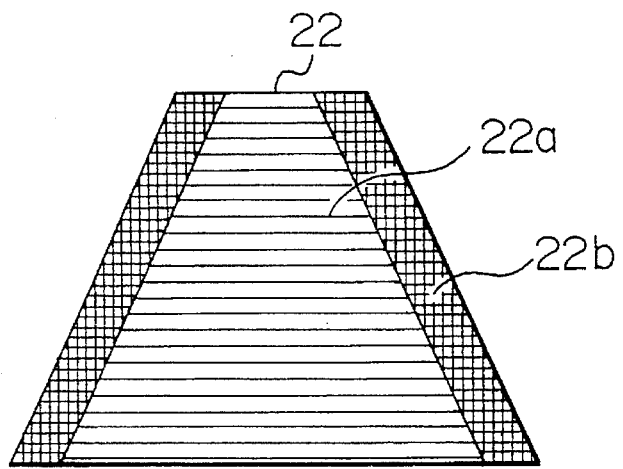
FIG. 19 is a side view showing the structure of the adsorbent carrying catalyst of the ninth embodiment.

FIG. 19 shows a adsorbent 22 carrying catalyst of a ninth embodiment of the invention. In the adsorbent 22, the whole surface of a monolithic carrier made of a ceramic or metal is coated with a zeolite HC adsorbent to form a adsorbent layer 22a. The adsorbent 22 generally has a shape similar to the adsorbent 15 (FIGS. 7 and 9) in the second embodiment described above or the block-shaped adsorbent 17 (FIG. 11) in the fourth embodiment, and a catalyst carrying layer 22b having a fixed thickness is formed only on the pair of sloping surfaces by a simple process in which the sloping surfaces are dipped to a certain depth in a solution containing a catalyst metal and then raised. This embodiment has an advantage that the adsorbent 22 carrying catalyst having a two-layer of adsorbent 22a and catalyst carrying layer 22b can simply be manufactured.

Figure 20:
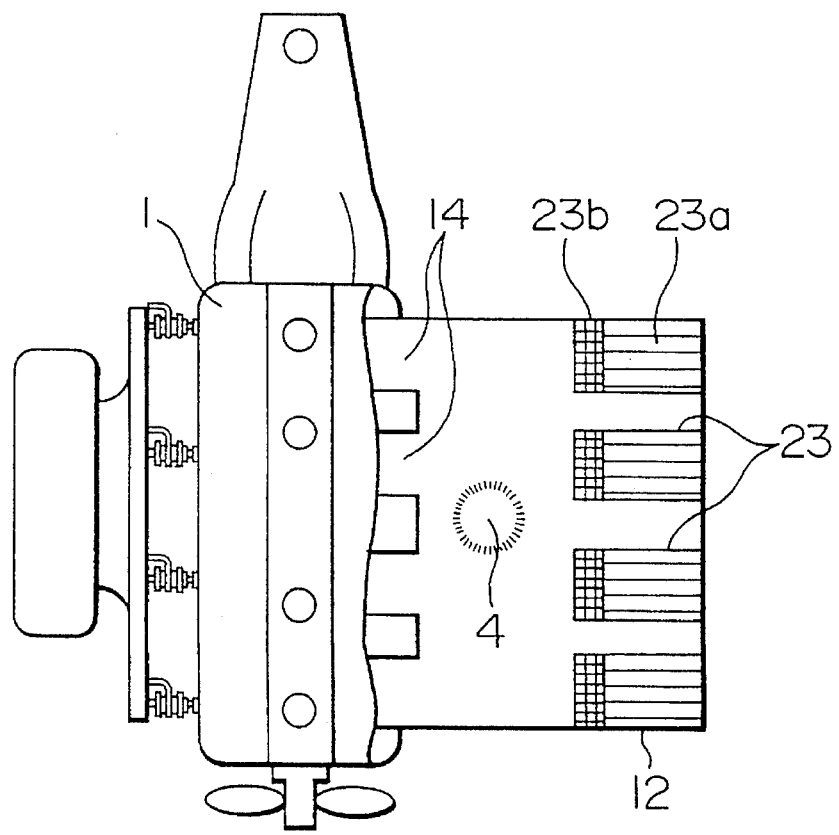
FIG. 20 is a partly sectional plan view showing the exhaust gas purification apparatus of the tenth embodiment.

FIG. 20 shows a tenth embodiment of the invention. The embodiment is also characterized in the structure of the HC adsorbent itself. That is, in the exhaust gas purification apparatus of the tenth embodiment, several cylindrical adsorbents 23 carrying catalyst are installed in the adsorption box 12 also acting as the exhaust manifold of the engine 1 so that they are arranged in the blow-down direction of the exhaust gas flowing from the exhaust ports 14.

The whole of the adsorbent 23 carrying catalyst forms an adsorbent layer 23a, and a catalyst metal is deposited only on the upstream end face thereof which can be the highest temperature by being heated by the exhaust gas directly striking the front thereof, thereby to form a catalyst carrying layer 23b. Since the direction of the pores of the honeycomb adsorbent 23 align with the blow-down direction of the exhaust gas, the exhaust gas flowing from the exhaust ports 14 and striking the upstream end face easily enters the pores of the adsorbent 23, and also, in combination with action of the catalyst carrying adsorbent 23b, a high HC reduction effect can be obtained. In addition, since the adsorbent 23 carrying catalyst has a simple shape and structure, it is easy to manufacture and also advantageous in terms of cost.

Figure 21:
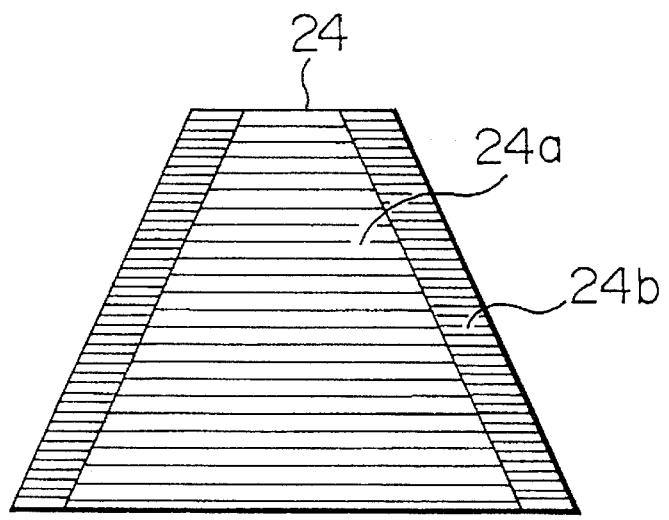
FIG. 21 is a side view showing the structure of the adsorbent carrying catalyst of the eleventh embodiment.

FIG. 21 shows an eleventh embodiment of the invention. The embodiment is also characterized in the structure of an adsorbent 24 carrying catalyst having an outer shape similar to the above described ninth embodiment. The adsorbent 24 carrying catalyst has a structure in which a HC adsorbent layer 24a as a main body is formed by applying a HC adsorbent such as zeolite on a honeycomb carrier comprised of ceramic such as alumina, and a catalyst carrying layer 24b is connected to a pair of sloping surfaces of the HC adsorbent layer 24a. In the catalyst carrying layer 24b, a catalyst is carried in a carrier in which corrugated sheets or flat plates of metal foil such as extremely thin stainless steel sheets are laminated in the shape of a honeycomb, the arrangement in the adsorption box 12, the setting of rectifier blades 13, and the like are also similar to the above described second embodiment (FIG. 7) or fourth embodiment (FIG. 11). Accordingly, also the same is the action that the exhaust gas enters the honeycomb structure of the adsorbent 24 carrying catalyst and HC is adsorbed.

In the eleventh embodiment, since the catalyst carrying layer 24b is structured by a metallic carrier having a small specific heat (heat capacity), and in addition, a relatively high-temperature exhaust gas flowing from the exhaust ports 14 of the engine 1 directly strikes the catalyst carrying layer 24b, the catalyst temperature rises at an early stage to activate the catalyst so that the HC coming into contact with the catalyst can be purified relatively early. Also, a purification rate of the HC desorbed from the HC adsorbent layer 24a can be enhanced.

Figure 22:
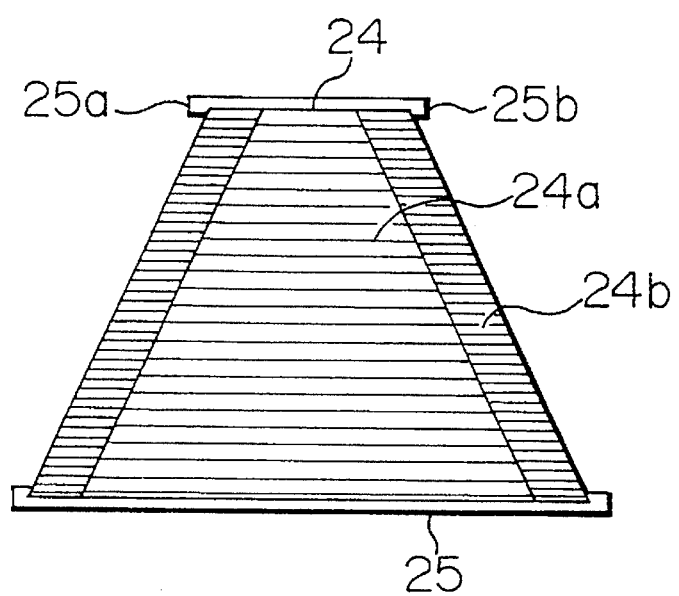
FIG. 22 is a partial sectional view showing the method for manufacturing the adsorbent carrying catalyst of the eleventh embodiment.

FIG. 22 shows a method for manufacturing the adsorbent 24 carrying catalyst of the eleventh embodiment. In the adsorbent 24 carrying catalyst, a thin cylindrical metallic carrier (catalyst carrying layer) 24b is connected to the pair of sloping surfaces of the cylindrical ceramic carrier (HC adsorbent layer) 24a as the main body which is coated with the HC adsorbent, as described earlier. The metallic carrier 24b has the same outer diameter as the ceramic carrier 24a and has a sloping surface on both ends thereof. Accordingly, as materials to be connected, the ceramic carrier 24a is made by alternately cutting a cylindrical stock slantwise as shown in FIG. 9, but the metallic carrier 24b is made by chipping off a cylindrical stock of the same diameter obliquely and in parallel. These materials are inserted into a metallic cylinder 25 having an inner diameter substantially the same as their outer diameter and having both ends 25a and 25b cut slantwise with respect to each other, and, after fitting the respective sloping surfaces, both ends 25a and 25b of the metallic cylinder 25 are caulked to complete the adsorbent 24 carrying catalyst. The metallic cylinder 25 can be secured within adsorption box 12 (FIGS. 7 and 8) by welding or the like. In addition, the catalyst carrying layer 24b consisting of a metallic carrier may be attached to the metallic cylinder 25 by welding.

Figure 23:
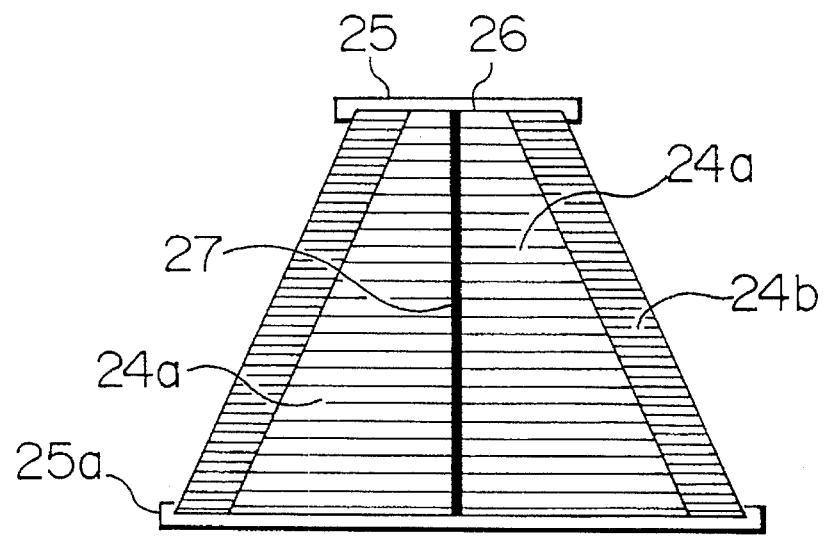
FIG. 23 is a partial sectional view showing the structure of the adsorbent carrying catalyst of the twelfth embodiment.
Figure 24:
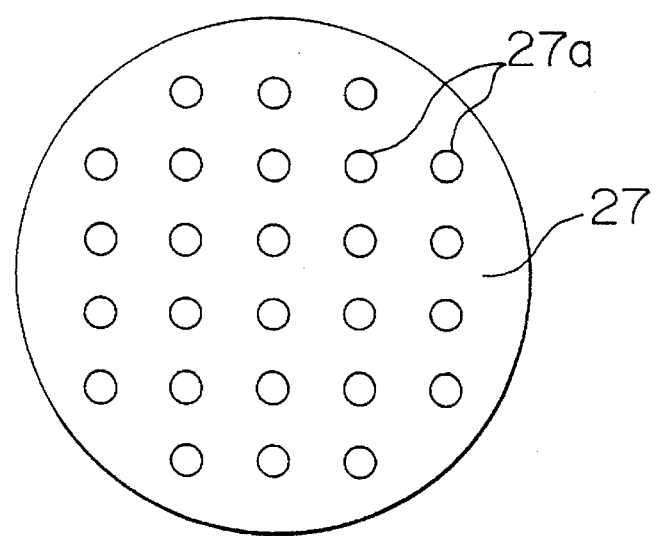
FIG. 24 is a front view of the member to be used for the adsorbent carrying catalyst of the twelfth embodiment.

FIGS. 23 and 24 show structure of an adsorbent 26 carrying catalyst as a twelfth embodiment of the invention. The adsorbent 26 carrying catalyst is a further development of the adsorbent 24 carrying catalyst of the eleventh embodiment, in which the ceramic carrier 24a in the adsorbent 24 carrying catalyst is cut symmetrically in the middle of the pair of sloping surfaces, and a punching metal 27 as shown in FIG. 24 is interposed between them. The remaining structure is similar to the above described eleventh embodiment.

Since punching metal 27 has many holes 27a, in the adsorbent 26 carrying catalyst of the twelfth embodiment, the pores of the ceramic carrier (HC adsorbent layer) 24a divided into left and right portions can communicate with each other through the punching metal holes 27a. Consequently, since the holes 27a act as a throat for appropriately limiting the flow of the exhaust gas passing through the adsorbent 26 carrying catalyst, the temperature rise in the HC adsorbent layer 24a can arbitrarily be delayed, whereby the holding time of HC is made longer and the temperature rise of the catalyst carrying layer 24b is accelerated to activate the catalyst early.

Figure 25:
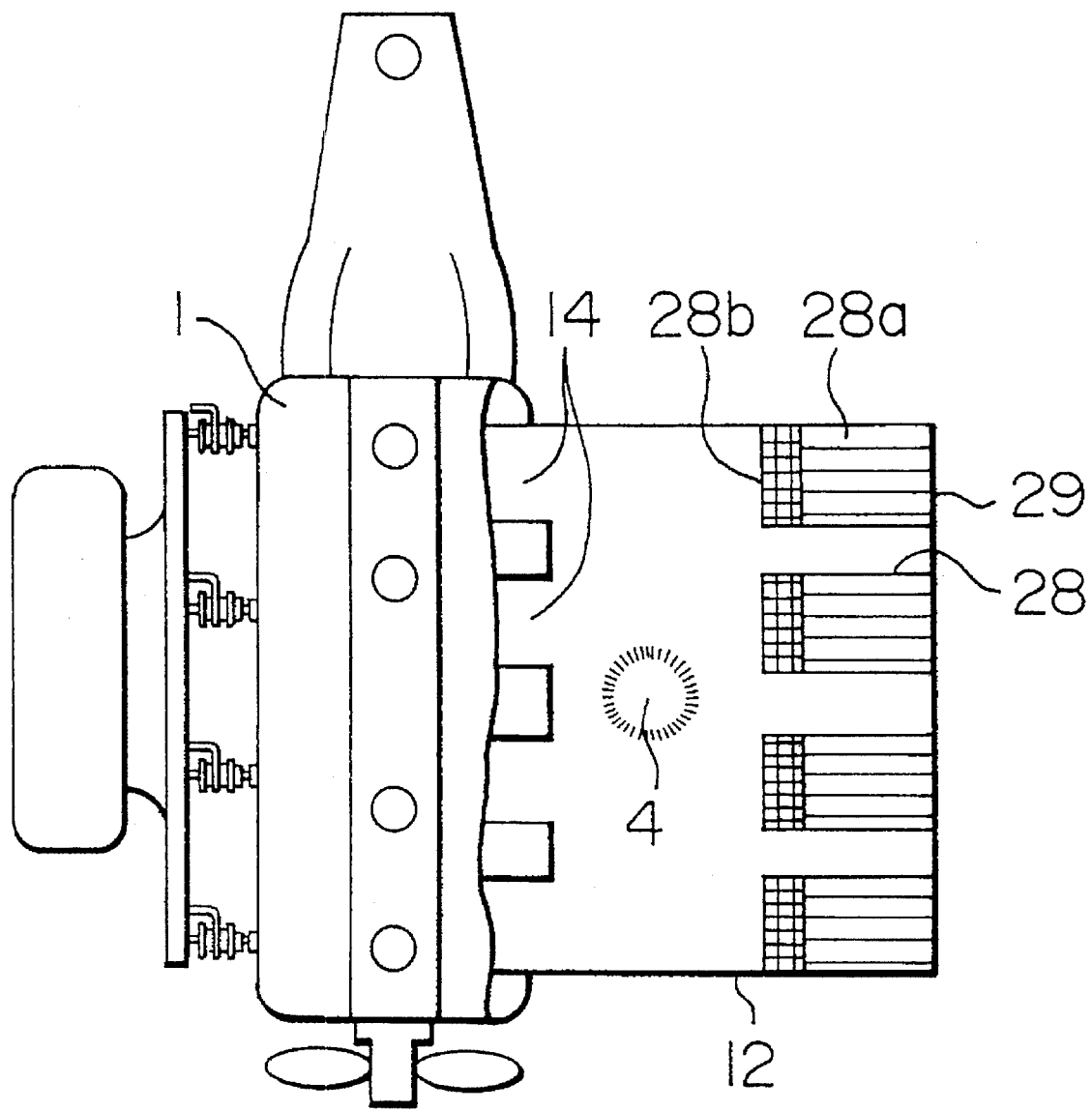
FIG. 25 is a partly sectional plan view showing the exhaust gas purification apparatus of the thirteenth embodiment.

FIG. 25 shows an exhaust gas purification apparatus including adsorbents 28 carrying catalyst as a thirteenth embodiment of the invention. The adsorbents 28 carrying catalyst have a cylindrical outer shape similarly to that 23 in the above described tenth embodiment (FIG. 20). Several adsorbents 28 carrying catalyst are installed in the adsorption box 12, which also acts as the exhaust manifold of the engine 1, in parallel with the blow-down direction of the exhaust gas flowing from the exhaust ports 14. Each of the adsorbent 28 carrying catalyst comprises a cylindrical ceramic carrier 28a for a HC adsorbent, a metallic carrier 28b for the catalyst connected to the upstream end face of the ceramic carrier 28a and also having a cylindrical shape, and a metallic cylinder 29 receiving them therein. The metallic cylinder 29 is secured by welding in the adsorption box 12.

The adsorbent 28 carrying catalyst in the thirteenth embodiment is easy to make and also easily installed in the adsorption box 12, and it is not only advantageous from the view of cost, but it can also produce a high HC reduction effect as can the above described tenth embodiment.

As a basic common advantage according to the respective first to fourteenth embodiment of the invention, at an engine cold-start which generates a relatively large amount of HC, most of the HC particles can be trapped by a HC adsorbent placed out of the flow path of the exhaust gas, and consequently, during such process, the catalyst can be fully warmed up by the heat of the exhaust gas to activate the catalyst. Compared with the prior art, in which all exhaust gas passes through the HC adsorbent during the above described process, in the invention, since only part of the exhaust gas enters the HC adsorbent and the temperature rise in the HC adsorbent due to the exhaust gas heat is delayed, the catalyst can be fully heated up before the HC adsorbent begins to desorb the HC adsorbed by it. Furthermore, this eliminates the need for additionally providing a heater with a large power consumption to accelerate warmup of the catalyst, and thus the amount of HC discharged at engine start can be greatly reduced by a simple-structured system.

Accordingly, in the exhaust gas purification apparatus according to the invention, since only part of the exhaust gas flows into or passes through the HC adsorbent, engine output is not reduced by ventilation resistance of the HC adsorbent, and even such HC adsorbent as zeolite which has a low heat resistance can be provided at a relatively upstream portion branching from the exhaust passage. Since this allows the catalyst also to be provided at a relatively upstream portion in the exhaust passage, the heatup of the catalyst by the exhaust gas heat becomes faster and the catalyst is activated to purify exhaust gas at an early stage. This leads to the common basic advantage that the need for providing an auxiliary heating means such as a heater having a large power consumption is obviated, as described above.

To examine the advantage produced by each embodiment, the above described basic advantage can be produced in the first to third embodiment. In the individual fourth to sixth and ninth to eleventh embodiments, the above described basic advantage can be further strengthened by the characteristic structural elements added for the respective embodiments, that is, rectifier means, cooling means, cover means, the junction part of the exhaust manifold, a communication path for the HC adsorbent for communication among exhaust ports of cylinders having different exhaust timing, a throat provided in the communication path, etc. Also in the seventh and eighth embodiments, the above described basic advantage can be strengthened by skillfully utilizing the EGR system.

In addition, in the twelfth to fourteenth embodiments, since the associated catalyst is activated earlier than the HC adsorbent by providing catalyst adjacent to the HC adsorbent, selecting a portion of the HC adsorbent itself, which is most easily heated to a high temperature, to provide a catalyst, or decreasing the heat capacity of a catalyst itself, HC purifying by the catalyst begins before the desorption of the HC adsorbed by the HC adsorbent begins and thus the possibility to discharge the HC outside is further reduced.

What is claimed is:

1. An exhaust gas purification system for purifying at least hydrocarbons (HC) from an exhaust gas emitted by an internal combustion engine, wherein the internal combustion engine is provided with an intake portion and an exhaust gas passage leading away from the internal combustion engine, the exhaust gas passage having an extended portion and a branched portion branching from the extended portion at a location downstream, relative to an exhaust gas flow, from the internal combustion engine, the system comprising:

a catalyst unit provided in the branched portion of the exhaust gas passage;

an HC adsorbent unit provided in the extended portion of the exhaust gas passage downstream from the branched portion of the exhaust gas passage;

an exhaust gas recirculation passage connecting said HC adsorbent unit to the intake portion of the internal combustion engine; and an exhaust gas recirculation control valve provided in said exhaust gas recirculation passage for selectively opening and closing the exhaust gas recirculation passage.

2. An exhaust gas purification system according to claim 1, wherein said HC adsorbent unit is provided in the extended portion of the exhaust gas passage directly downstream from the branched portion of the exhaust gas passage to continuously receive the exhaust gas, and wherein HC from said HC adsorbent unit is returned to the intake portion when said exhaust gas recirculation control valve is open.

3. An exhaust gas purification system according to claim 1, wherein said HC adsorbent unit comprises a zeolite HC adsorbent provided in a heat-resistant carrier.

4. An exhaust gas purification system according to claim 1, further comprising rectifier means for guiding the exhaust gas provided between the internal combustion engine and said HC adsorbent unit.

5. An exhaust gas purification system according to claim 1, wherein said HC adsorbent unit includes a cooling means for delaying a rise in temperature of said HC adsorbent unit.

6. An exhaust gas purification system according to claim 1, wherein said HC adsorbent unit includes a cover portion arranged so as to restrain a rise in temperature of said HC adsorbent unit.

7. An exhaust gas purification system according to claim 1, further comprising an air-fuel ratio sensor provided in the exhaust gas passage between the internal combustion engine and said catalyst unit, wherein a control cycle of air-fuel ratio feedback control of said internal combustion engine, based on a value detected by said air-fuel ratio sensor, is made shorter while said exhaust gas recirculation control valve is open compared to while said exhaust gas recirculation control valve is closed.

8. An exhaust gas purification system according to claim 1, wherein said HC adsorbent unit is provided in the exhaust passage at the location at which the branched portion branches from the extended portion.

9. An exhaust gas purification system for purifying at least hydrocarbons (HC) from an exhaust gas emitted by an internal combustion engine, wherein the internal combustion engine is provided with an exhaust gas passage leading away from the internal combustion engine, the exhaust gas passage having an extended portion and a branched portion branching from the extended portion at a location downstream, relative to an exhaust gas flow, from the internal combustion engine, the system comprising:

a temperature-dependent catalyst unit provided in the branched portion of the exhaust gas passage; and an HC adsorbent unit provided in the extended portion of the exhaust gas passage downstream from the branched portion of the exhaust gas passage, said HC adsorbent unit being adapted to adsorb HC from the exhaust gas while the exhaust gas is at a temperature at which said catalyst unit is inactive and being adapted to desorb adsorbed HC while the exhaust gas is at a temperature at which said catalyst unit is active, a downstream side of said HC adsorbent unit being closed.

10. An exhaust gas purification system according to claim 1 or 9, wherein said HC adsorbent unit includes an HC purification catalyst material provided at a portion of said HC adsorbent unit which is heated by the exhaust gas.

11. An exhaust gas purification system according to claim 1 or 9, wherein said HC adsorbent unit includes an HC purification catalyst carried in a carrier, said HC purification catalyst carrier being made from a material having a small specific heat.

12. An exhaust gas purification according to claim 11, wherein said HC adsorbent unit includes an HC adsorbent provided in a ceramic carrier, wherein said HC purification catalyst carrier is made from stainless steel.

13. An exhaust gas purification system for purifying at least hydrocarbons (HC) from an exhaust gas emitted by exhaust ports of an internal combustion engine, wherein the internal combustion engine is provided with an exhaust manifold and an exhaust gas passage leading away from the internal combustion engine, the exhaust gas passage having an extended portion and a branched portion branching from the extended portion at a location downstream, relative to an exhaust gas flow, from the internal combustion engine, the system comprising:

a catalyst unit provided in the branched portion of the exhaust gas passage; and an HC adsorbent unit provided in the exhaust gas passage at the location at which the branched portion of the exhaust gas passage branches from the extended portion of the exhaust gas passage.

14. An exhaust gas purification system according to claim 13, wherein said HC adsorbent unit includes a communication path communicating an interior of said HC adsorbent unit with the exhaust manifold of the internal combustion engine.

15. An exhaust gas purification system according to claim 14, wherein said communication path includes a throat portion.

* * * * *